(12) United States Patent
Takafuji et al.

(10) Patent No.: US 6,859,731 B2
(45) Date of Patent: Feb. 22, 2005

(54) COLLISION DAMAGE REDUCTION SYSTEM

(75) Inventors: Tetsuya Takafuji, Anjo (JP); Tomoji Suzuki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/342,315

(22) Filed: Jan. 15, 2003

(65) Prior Publication Data

US 2003/0139883 A1 Jul. 24, 2003

(30) Foreign Application Priority Data

Jan. 16, 2002 (JP) ........................................ 2002-007103

(51) Int. Cl.[7] .............................................. G06F 17/10
(52) U.S. Cl. ........................ 701/301; 342/72; 180/167
(58) Field of Search ................................ 701/300, 301, 701/96, 117, 33, 36, 48; 342/70, 71, 72; 180/167–169

(56) References Cited

U.S. PATENT DOCUMENTS

| | | | | |
|---|---|---|---|---|
| 5,572,428 A | * | 11/1996 | Ishida et al. | ................. 701/301 |
| 6,085,151 A | * | 7/2000 | Farmer et al. | ................. 701/301 |
| 6,370,475 B1 | * | 4/2002 | Breed et al. | ................. 701/301 |
| 6,405,132 B1 | * | 6/2002 | Breed et al. | ................. 701/301 |
| 6,420,996 B1 | * | 7/2002 | Stopczynski et al. | ......... 342/70 |
| 6,420,997 B1 | * | 7/2002 | Cong | ........................... 342/70 |
| 6,459,411 B2 | * | 10/2002 | Frazier et al. | .............. 342/455 |
| 6,484,087 B2 | * | 11/2002 | Shirai et al. | .................. 701/96 |

FOREIGN PATENT DOCUMENTS

| | | |
|---|---|---|
| JP | 7-57182 | 3/1995 |
| JP | 10-283593 | 10/1998 |
| JP | 2000-62555 | 2/2000 |
| JP | 2000-276696 | 10/2000 |

\* cited by examiner

*Primary Examiner*—Richard M. Camby
(74) *Attorney, Agent, or Firm*—Posz & Bethards, PLC

(57) ABSTRACT

In a collision damage reduction system, a microcomputer obtains relative position data corresponding to a relative between a vehicle and an object from a first detecting unit, the detected speed of the vehicle as detected by a second detecting unit, the detected turning angle of the vehicle as detected by a third detecting unit. The microcomputer calculates a total collision probability representing a probability that the vehicle and the object will collide on a runnable space according to the relative position data, the detected speed of the own vehicle and the detected turning angle. In addition, the microcomputer instructs the operation unit to operate at least one of a first collision avoidance operation and a second collision avoidance operation according to the total collision probability.

18 Claims, 5 Drawing Sheets

COLLISION DAMAGE REDUCTION SYSTEM

BACKGROUND OF THE INVENTION

CROSS REFERENCE TO RELATED APPLICATION

This application is based upon and claims the benefit of priority of Japanese Patent Application 2002-7103 filed on Jan. 16, 2002, the contents of which are incorporated herein by reference.

1. Field of the Invention

The invention relates vehicle collision avoidance systems, and particularly to a collision damage reduction system for reducing damage in a collision.

2. Description of the Related Art

Japanese Patent Publication No. 2000-276696 discloses a collision probability operation technique that generates probability distribution information representing a probability distribution that a first vehicle will be present in time and space substantially in the running direction thereof, and that transmits the probability distribution information to a second vehicle in the vicinity of the first vehicle.

In addition, the collision probability operation technique receives probability distribution information representing a probability distribution that the second vehicle will be present in a time and space substantially in the running direction thereof so as to operate a point of time and space at which the first vehicle will collide with the second vehicle and a probability that the first vehicle will collide with the second vehicle at the point of time and space on the basis of the probability distribution information of the first and second vehicles. The collision probability operation technique instructs the first vehicle to avoid a collision with the second vehicle on the basis of the operated point of time and space and the operated probability.

The above collision probability operation technique determines the expected running locus of the first vehicle including its current running direction with predetermined shifts on both sides of the current course (running direction) of the first vehicle, and the expected running locus of the second vehicle including its current running direction with predetermined shifts on both sides of the current course (running direction) thereof. The collision probability operation technique also calculates a collision probability between the first and second vehicles on the basis of the probability that the vehicles exist in the time-space region on which both of the expected running loci of vehicles overlap.

In the above collision probability operation technique, however, when the driver of one of the vehicles becomes aware of the danger of collision and suddenly steers the steering wheel or applies the brake, the shape of the time-space region on which the both of the expected running loci of the vehicles overlap suddenly varies. The sudden variation in the shape of the time-space region causes the problem such that the possibility of collision between the vehicles and/or the actual collision therebetween occurs even if the collision avoidance technique judges that no collision occurs according to the collision probability.

In addition, in the above collision probability operation technique, the first vehicle needs to communicate with the second vehicle to receive the data related to the expected running locus of the second vehicle calculated thereby. Therefore, the collision probability operation technique can be used only when the second vehicle includes a collision probability operation unit capable of executing the collision probability operation technique.

In addition, the first vehicle must regularly communicate with vehicles in proximity thereto so that, in cases where the first vehicle runs on a congested road, it is difficult for the first vehicle to identify data sent from the other vehicles as data corresponding to the vehicle closest to the first vehicle.

Furthermore, use of the above collision probability operation technique of the Japanese Patent Publication for a protecting device that effectively protects occupants in a vehicle at the time of actual collision is not disclosed.

As another reference related to Japanese Patent Publication No. 2000-276696, Japanese Patent Publication No. 7-57182 discloses an apparatus that estimates the expected running locus of a vehicle and that of an object with which the vehicle is supposed to collide in time and space so as to prevent the vehicle from colliding with the object or to reduce impact in a collision.

In addition, Japanese Patent Publication No. 10-283593 discloses a collision warning technique that assumes that the sum of width of a vehicle and those of predetermined margins at both sides of the vehicle is regarded as a running region of the vehicle. The collision warning technique of the Japanese Patent Publication No. 2000-276696 also calculates each collision probability between the a vehicle and each three-dimensional object ahead of the vehicle on the basis of a relationship between the vehicle and each position of each three-dimensional object so as to generate a warning according to each of the calculated collision probabilities.

However, the above conventional techniques, still include many of the above discussed limitations except for the limitation related to inter-vehicle communication.

SUMMARY OF THE INVENTION

In view of the foregoing, it is an object of the present invention to provide a collision damage reduction system that is capable of improving effects of avoiding a collision and/or reducing damage in a collision.

According to one aspect of the invention, a collision damage reduction system is installed in a vehicle and has an operation unit capable of performing at least one of a first operation of avoiding a collision of the own vehicle with an object and a second operation of reducing damage in the collision. The system includes a first detecting unit configured to regularly detect a relative position data corresponding to a relative position between the own vehicle and the object, a second detecting unit configured to regularly detect a speed of the vehicle, a third detecting unit configured to regularly detect a turning angle of the vehicle, means for obtaining first performance limit data of the vehicle according to the detected speed thereof and second performance limit data of the object according to the relative position data, the detected speed of the vehicle and the detected turning angle thereof, means for calculating a total collision probability representing a probability that the vehicle and the object will collide with each other on a runnable space according to the first performance limit data, the second performance limit data, the detected speed of the own vehicle and the relative position data, the vehicle and object being runnable on the runnable space, and means for instructing the operation unit to operate at least one of the first operation and the second operation according to the total collision probability.

According to another aspect of the invention, a computer-readable program product is used for a collision damage reduction system, in which the collision reduction system is installed on a vehicle and has an operation unit capable of performing at least one of a first operation of avoiding a collision of the vehicle with an object and a second operation of reducing damage in the collision, a first detecting unit configured to regularly detect relative position data corresponding to a relative position between the vehicle and the object, a second detecting unit configured to regularly detect a speed of the vehicle, and a third detecting unit configured to regularly detect a turning angle of the vehicle. The program product includes means for causing a computer to obtain first performance limit data of the vehicle according to the detected speed thereof and second performance limit data of the object according to the relative position data, the detected speed of the own vehicle and the detected turning angle thereof, means for causing a computer to calculate a total collision probability representing a probability that the vehicle and the object will collide with each other on a runnable space according to the first performance limit data, the second performance limit data, the detected speed of the vehicle and the relative position data, with the vehicle and object being runnable on the runnable space, and means for causing a computer to instruct the operation unit to operate at least one of the first operation and the second operation according to the total collision probability.

BRIEF DESCRIPTION OF THE DRAWINGS

Other objects and aspects of the invention will become apparent from the following description with reference to the accompanying drawings in which.

DETAILED DESCRIPTION OF EMBODIMENTS OF INVENTION

Figure 1:
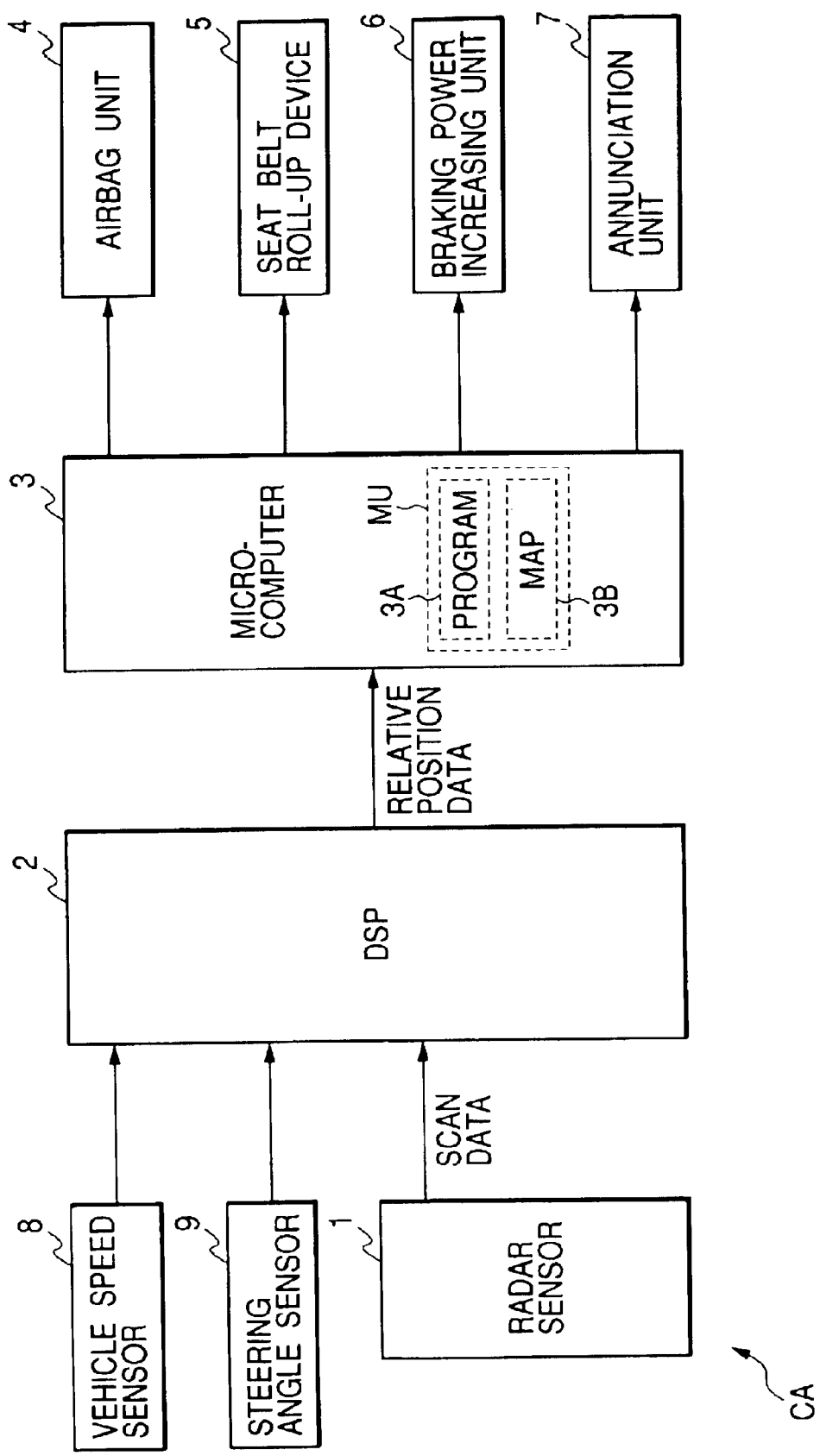
FIG. 1 is a functional block diagram showing elements of a collision damage reduction system for vehicles and a relationship among the elements according to an embodiment of the invention.

According to one embodiment of the present invention, a runnable two dimensional region or a runnable time-space region that means a runnable space or a time-space on which a vehicle and an object are runnable is detected according to a first performance limit data of the vehicle and a second performance data of the object so that a distribution of local collision probabilities is calculated over the runnable time-space region. To perform integration of each local collision probability allows a total collision probability to be obtained.

This configuration improves collision avoidance between the vehicle and the object, and/or enables damage in the collision therebetween to be reduced as compared with conventional collision avoidance systems. That is, for example, it is possible to accurately turn the vehicle in a direction to which to which the local collision probabilities are decreased, to accurately brake the vehicle or to otherwise accurately operate the vehicle to reduce damage in a collision.

For example, according to the embodiment, a total collision probability is calculated on the basis of the distribution of local collision probabilities of the vehicle and that of local collision probabilities of the object. The operation of avoiding a collision between the vehicle and the object and/or that of reducing damage in a collision therebetween is controlled according to the total collision probability.

In conventional collision avoidance systems, because the influence on each locus of each of two vehicles about to collide due to the sudden steering or braking thereof is not taken into consideration, the accuracy of the resulting calculated collision probability may be decreased.

In contrast, in the present invention, the collision probability is obtained according to the performance limit data of the vehicle and that of the object, wherein the performance limit data of the vehicle represents a limit of the change of locus of the vehicle, and the performance limit data of the object represents a limit of the change of locus of the object.

For example, a first running locus of the vehicle on the runnable space is expected according to the performance limit data of the vehicle, and a second running locus of the object on the runnable space is expected according to the performance limit data of the object. A region on which the first running locus of the vehicle and the second running locus of the object are temporally spatially overlapped is obtained so that the overlapped region is expected as a collision region on which the vehicle and the object will collide with each other. A first probability distribution (local probability distribution) including probabilities that the vehicle will exist on the collision region is obtained according to the performance limit data of the vehicle, and a second probability distribution (local probability distribution) including probabilities that the object will exist on the collision region is obtained according to the performance limit data of the object. As a result, the total collision probability is calculated according to the obtained first and second probability distributions, making it possible to avoid a collision between the vehicle and the object and/or reduce damage in a collision therebetween.

Therefore, it is possible to accurately obtain the local probability distributions and the total probability while considering the sudden steering of the vehicle and the object, and the sudden braking of each brake thereof, making it possible to determine the operation of at least one of avoiding a collision between the vehicle and the object or reducing damage in a collision therebetween in accordance with the actual situation.

Throughout the specification, the term "runnable space" will be used to refer to a space on which the vehicle or the object is runnable, or more simply, a horizontal two-dimensional projection space on which the vehicle or the object is runnable. Further simply, the "runnable space" means a collection of large number of expected locus regions along which the vehicle or the object is runnable and each expected locus region includes a predetermined occupied width of the vehicle or the object in a horizontal direction orthogonal to its running direction. The horizontal two-dimensional projection space is also referred to as "runnable two dimensional region".

The "runnable time-space" means that a three dimensional time-space consisting of the runnable two-dimensional region and a time axis. The three dimensional time-space is also referred to as "runnable time-space region". More simply, the "runnable time-space" means a collection of three dimensional loci in the runnable two dimensional region along which the vehicle or the object is runnable.

In addition, the "local collision probabilities" means probabilities that the vehicle or the object will exist on a unit region (local region) with a predetermined area in the runnable time-space region so that performing convolution integration of each local collision probability of each local region over the whole of the runnable time-space region allows the total collision probability of the runnable time-space region to be obtained. In particular, the total collision probability of the runnable two dimensional region can be obtained by performing convolution integration of each local collision probability of each local region in the runnable time-space region along the time axis direction.

In order to simplify operations related to the convolution integration, a collision probability that the vehicle or the object will exist on each point of a right-left direction orthogonal to its running direction may be obtained as "right-left local collision probability" and performing convolution integration of each right-left local collision probability over all line segments on which the vehicle or the object can exist allows the total collision probability to be obtained.

That is, assuming that the current running direction of the vehicle or the object is determined as "Y direction" and the right-left direction orthogonal to the Y direction is determined as "X direction" so that the runnable two dimensional region is constituted by the X and Y directions, the right-left local collision probability may be obtained by performing convolution integration of each local collision probability of each local region in the runnable two dimensional region along the Y direction. This allows a distribution of the right-left local collision probabilities in a one-dimensional space (runnable line segment region) along the direction orthogonal to the current running direction of the vehicle or the object to be obtained. Furthermore, the total collision probability may be obtained by performing convolution integration of each right-left local collision probability of each local region in the one dimensional region along the X direction.

In addition, the "performance limit data" includes a maximum displaceable amount of the vehicle or the object in a direction orthogonal to its running direction at the current time during the movement of the vehicle or the object by unit distance in its running direction, or after a predetermined unit time being passed, wherein the maximum displaceable amount of the vehicle or the object means a maximum turning performance thereof.

The "performance limit data" also includes a maximum speed rate (a usual maximum decelerating rate) of the vehicle or the object in its running direction at the current time.

In order to simplify operations of obtaining the performance limit data, the speed rate may be assumed to be zero, or the speed rate may be assumed to be a current speed rate. The speed rate may be assumed to a value within a range from zero to the current speed rate. The speed rate may be assumed to a value within a range from zero to a predetermined value determined by the maximum speed rate.

Usually, when the driver of the vehicle recognizes a danger of collision, the driver applies the brake force maximally to the vehicle so that the current speed rate may be adopted as the maximum speed rate until the speed of the vehicle or the object suddenly changes, and after the sudden change of the speed, the maximum decelerating rate of the vehicle or the object at the sudden change of its speed may be adopted as the maximum speed rate.

In cases where the speed rate may be assumed to have a value within a range from zero to a predetermined value determined by the maximum speed rate, the speed of the vehicle or the object is variable according to the amount and the timing of handling the brake. However, the driver's tendency of how to handle the brake shows a predetermined probability distribution. Therefore, after a predetermined time passes from the sudden change of the speed of the vehicle or the object, the speed may be involved within a range from a minimum speed determined by the maximum speed rate to a maximum speed determined by no handling the brake, and each speed within the range from the minimum speed to the maximum speed has each predetermined probability determined by the probability distribution. Reasonably, performing integration of each probability of each speed over the range from the minimum speed to the maximum speed allows the value of "1" to be obtained.

Similarly, regarding the maximum turning performance, the driver can turn the steering wheel at any steering angle of the vehicle within a range determined by the maximum turning performance.

Usually, before the driver of the vehicle recognizes a danger of collision, it is no problem to assume that the driver turns the steering wheel to keep the vehicle to the current position in the width direction of the current running road. When the driver of the vehicle recognizes a danger of collision, it is necessary to assume that the driver turns the steering wheel to steer the vehicle in a direction away from the object within the range determined by the maximum turning performance. Therefore, it is possible to estimate a probability representing which steering angles are set at a predetermined point of time or each point on a predetermined locus of the vehicle in accordance with the driver's steering pattern (danger response pattern) of the steering wheel on the basis of the current running condition of the vehicle.

Operations for avoiding a collision include a turning operation, a braking operation, an operation of stopping an engine, an operation of announcing an alert or the like. The operations of reducing damage in a collision include an operation of deploying each airbag, an operation of increasing tension of each seat belt, an operation of increasing the braking power and an operation of announcing an alert. In addition, when special devices for measuring the severity of a collision are installed on the vehicle, operations of starting the special devices are performed.

The operations of avoiding a collision or reducing damage in a collision include an operation of selecting one or a combination of the above collision avoiding operations and the damage reducing operations, an operation of setting an operating level to at least one of the above collision avoiding operations and the damage reducing operations on the basis of the total collision probability and an operation of setting a start timing of at least one of the above collision avoiding operations and the damage reducing operations.

As another embodiment, a relative speed between the vehicle and the object is calculated according to the relative position data, the detected speed of the vehicle and the detected turning angle thereof, making it possible to instruct the operation unit to operate at least one of the first operation and the second operation according to the total collision probability and the relative speed.

That is, according to another embodiment of the invention, it is possible to more accurately estimate damage in a collision on the basis of the total collision probability and the relative speed.

For example, when the relative speed V is increased, damage in a collision is expected to be serious so that the collision avoiding operations and the damage reducing operations are immediately performed. When even if the total collision probability is high, in cases where the own vehicle is running at reduced speed and the object is stopped, it is preferable to perform the collision avoiding operations and the damage reducing operations in a non-expedited manner. For example, after the surroundings around the vehicle are checked, it may be possible to perform the collision avoiding operations and the damage reducing operations, and it is preferable to initiate airbag deployment in a non-expedited manner and to set inner pressure in each airbag not to be very large.

That is, in this embodiment, it is possible to perform at least one of the collision avoiding operations and the damage reducing operations according to the total collision probability and the relative speed, causing effects of reducing damage in a collision to be improved.

Still further, the time remaining until the vehicle and the object will collide with each other is calculated according to the collision region, making it possible to instruct the operation unit to operate at least one of the first operation and the second operation according to the total collision probability and the remaining time.

That is, according to a further embodiment of the invention, it is possible to further reduce damage in a collision on the basis of the total collision probability and the remaining time until collision. The remaining time can be calculated on the basis of the running loci of the vehicle and the object, and the speed of each of the vehicle and the object.

That is, it is different to select the at least one of the collision avoiding operations and the damage reducing operations according to whether the total collision probability is high or low and whether the remaining time is sufficient or insufficient.

For example, when the total collision probability is high and the remaining time is sufficient, it is preferable to delay to deployment of each airbag within a range for protecting each occupant in the vehicle, or to perform an operation such as, for example, braking without deploying each airbag.

In contrast, when the total collision probability is not very high and the remaining time is insufficient, immediate deployment of each airbag is required.

Therefore, in this embodiment, it is possible to determine priority of selecting the collision avoiding operations and the damage reducing operations and to set operating levels according to not only the total collision probability but also the remaining time, making it possible to improve collision avoidance and/or collision damage.

In yet a further embodiment of the invention, in cases where the operation unit includes an airbag unit, it is possible to instruct the operation unit to deploy each airbag at a predetermined timing, or to change a deployment mode of each airbag according to the total collision probability. In a further embodiment of the invention, it is possible to instruct the operation unit to control an object, such as to steer the object or to brake it, according to the total collision probability. In a further embodiment of the present invention, it is possible to announce alerts having different levels at suitable timings, respectively, according to the total collision probability.

A still further embodiment of the invention will be described in detail hereinafter with reference to the accompanying drawings.

FIG. 1 is a functional block diagram showing elements of a collision damage reduction system for vehicles and a relationship among the elements.

The collision damage reduction system CA is installed in a vehicle 100 with a predetermined width of W1 shown in FIG. 4 hereinafter.

The collision damage reduction system CA comprises a radar sensor 1, as a part of detecting unit, configured to regularly emit an electromagnetic wave beam to scan a predetermined region around the own vehicle 100. The electromagnetic beam is also referred to simply as "radar beam" hereinafter.

The radar sensor 1 is configured to regularly receive the echo, that is the electromagnetic wave reflected from at least one object 200 shown in FIGS. 4 and 5 hereinafter, such as at least one other vehicle or the like, which has a predetermined width W2 and is runnable. The radar sensor 1 is configured to regularly output data required for detecting a relative distance of at least one object 200 with respect to the own vehicle 100, at least one object 200 which is positioned ahead of the own vehicle 100.

The collision damage reduction system CA also comprises a digital signal processor 2, as a part of the detecting unit, which is communicable with the radar sensor 1 through a wire or wireless connection. The digital signal processor, which is referred to simply as "DSP" 2 is configured to process the outputted data to perform an operation for obtaining the relative distance of the at least one object 200 with respect to the own vehicle 100 and a relative angle thereof with respect to the own vehicle 200, at least one object which is referred to simply to as "object" hereinafter. The collision damage reduction system CA further comprises a microcomputer 3, an airbag unit 4, a seat belt roll-up device 5, a braking power increasing unit 6 and an annunciation unit 7. The microcomputer 3 is communicable with the DSP 2, and the airbag unit 4, the seat belt roll-up device 5 and the braking power increasing unit 6 are communicable with the microcomputer 3 through wire or wireless connections, respectively.

The microcomputer 3 is configured to perform an operation for obtaining a distribution of local collision probabilities of the vehicle 100 in a runnable time-space region thereof according to the vehicle's performance limit data. The microcomputer 3 is also configured to obtain a total collision probability according to the distribution of local collision probabilities of the vehicle 100. The microcomputer 3 is also configured, according to the obtained total collision probability, to instruct at least one of collision avoidance unit including the annunciation unit 7 to operate so as to avoid the collision of the vehicle 100 and the object 200. For example, the annunciation unit 7 operates to announce an alert to alert the driver so as to avoid a collision of the vehicle 100 and the object 200. A swing unit such as one of the collision avoidance units operates to swing the vehicle 100 by a predetermined angle so as to avoid the collision of the vehicle 100 and the object 200. A braking unit such as one of the collision avoidance units operates to brake the vehicle 100 so as to avoid the collision of the vehicle 100 and the object 200. An engine driving unit such as one of the collision avoidance units operates to stop the drive of the engine so as to avoid the collision of the vehicle 100 and the object 200.

Furthermore, the microcomputer 3 is also configured, according to the obtained total collision probability and so on, to instruct at least one of collision damage reduction units including the airbag unit 4, the seat belt roll-up device 5 and the braking power increasing unit 6 to operate to reduce damage in a collision.

For example, the airbag unit 6 operates to deploy each airbag so as to absorb shock in a collision. The seat belt roll-up device 5 operates to roll-up each seat belt so as to increase tension of each seat belt. The braking power increasing unit 6 operates to increase the braking power of the braking unit.

The collision damage reduction system CA is also equipped with a vehicle speed sensor 8 configured to regularly detect the current speed of the own vehicle 100 and a steering angle sensor 9 configured to detect the steering angle of the vehicle 100 so as to detect a turning angle thereof. The vehicle speed sensor 8 and the steering angle sensor 9 are communicated with the DSP 2 in wire or wireless connections, respectively.

The radar sensor 1 is installed, for example, at a center portion of a front surface of the vehicle 100. The radar sensor 1 has a radar beam emitting unit for regularly emitting the radar beam toward a front side from the vehicle 100 so as to regularly scan horizontally a region at a predetermined height from the ground within a predetermined angle from right to left. This kind of radar sensor 1 is substantially the same as a radar unit installed in aircraft, or a stationary radar unit.

The radar sensor 1 regularly outputs scan data including the scan angle information representing the scan angle of the current emitted radar beam, each receiving timing of each echo at which each echo is received thereby and each receiving angle of each echo.

The DSP 2 receives the scan data regularly outputted from the radar sensor 1 and including the scan angle information, each receiving timing of each echo and each receiving angle thereof.

The DSP 2 regularly determines a current relative distance L of the object 200 with respect to the vehicle 100, and a current relative angle θ of the object 200 with respect to a direction orthogonal to the running direction of the vehicle 100 on the basis of the received scan data.

More specifically, the DSP 2 multiplies the time T1 by "the radar beam transmission speed/2" to calculate the relative distance L of the object 200 with respect to the vehicle 100 on a predetermined direction at the angle θ with respect to the direction orthogonal to the running direction. The time T1 represents the time from which the radar beam is emitted from the radar beam emitting unit of the radar sensor 1 to the predetermined direction at the angle of θ to which the echo corresponding to the emitted radar beam and reflected from the predetermined direction is received by the radar beam emitting unit of the radar sensor 1. Incidentally, the vehicle running speed is much slower than the radar beam transmission speed so that the effect of the vehicle running speed can be ignored when calculating the relative distance.

The DSP 2 outputs relative position data including the calculated relative angle θ and the calculated relative distance L of the object 200 to the microcomputer 3. The structure of the system of detecting the relative position data of the object 200 with respect to the vehicle 100 is not limited to the above structure. A known laser ranging device may be used in place of the radar sensor 1, or a pair of known image area sensors may be used in place of the radar sensor. The paired image sensors output images including the object 200 so that the DSP can calculate, by using triangulation, the relative distance of the object 200 with respect to the vehicle 100 on the basis of the distance between the two images. In addition, in place of the data including the relative distance L of the object 200 with respect to the vehicle 100 and the relative angle θ thereof, the DSP may convert the relative distance L and the relative angle θ of the object 200 into a first relative distance of the object 200 with respect to the vehicle 100 in the running direction (Y direction) thereof and a second relative distance (X direction) of the object 200 with respect to the vehicle 100 in a right-left direction orthogonal to the Y direction so as to output the first and second relative distances to the microcomputer 3.

The microcomputer 3 includes a memory unit MU on which computer-readable programs (program products) including a collision damage reduction program 3A are stored. The collision damage reduction program 3A may be stored on mobile storage mediums such as compact disk, digital versatile disk or the like. In addition, on the memory unit MU, map (map data) 3B described hereinafter is stored.

The microcomputer 3 performs processes shown in FIGS. 2 and 3 described hereinafter in accordance with at least the collision damage reduction program 3A.

That is, the microcomputer 3 regularly receives the outputted relative position data of the object 200 from the DSP 2 including the relative distance L and the relative angle θ of the object 200, and operates, on the basis of the received relative position data of the object 200, the total collision probability between the vehicle 100 and the object 200, the relative speed between the vehicle 100 and the object 200 and the remaining time until which the vehicle 100 may collide with the object 200. The microcomputer 3 determines whether or not to make operate each of the collision avoidance units including the annunciation unit 7 and the collision damage reduction units including the airbag unit 4, the seat belt roll-up device 5 and the braking power increasing unit 6. Furthermore, when determining to make operate at least one of the collision avoidance units and the collision damage reduction units, the microcomputer 3 determines the operating range (operating level) of the at least one of the collision avoidance units and the collision damage reduction units so as to control the at least one of the collision avoidance units and the collision damage reduction units on the basis of the determined operating range.

Next, operations of the DSP 2 and the microcomputer 3 shown in FIGS. 2 and 3 will be explained hereinafter.

(Calculation of Total Collision Probability)

When calculating the total collision probability, in order to simplify the calculations thereof, this embodiment is based on the assumption described hereinafter.

That is, when expecting a running locus of the vehicle 100 on the runnable two dimensional region and that of the object 200, one element of setting the maximum turning performance of each of the vehicle 100 and the object 200, that is, the maximum horizontal gravity $G_{xmax}$ in the X direction (right-left direction) is assumed as a constant value all the time. When assuming that the maximum horizontal gravity $G_{xmax}$ is the constant value, using the running speed of the vehicle 100 detected by the vehicle speed sensor 8 and that of the object 200 detected by the radar sensor 1 allows each minimum turning radius $R_{min}$ of each of the vehicle 100 and the object 200 to be obtained in accordance with the following equation (1):

$$R_{min} = V \times V / G_{xmax} \quad (1)$$

In which the reference character V represents the running speed of the vehicle 100 or that of the object 200.

That is, in this embodiment, the maximum turning performance of the vehicle 100 means the maximum steering-range within which the driver can maximally set the steering angle of the vehicle 100 in its right-left direction.

A probability distribution including probabilities representing which steering angles of the vehicle 100 are set by its driver within the maximum steering-angle range in its right-left direction realizing its minimum turning radius $R_{min}$ is assumed so that the probabilities are identical to other. Similarly, a probability distribution including probabilities representing which steering angles of the object 200 are set by its driver within the maximum steering-angle range in its right-left direction realizing its minimum turning radius $R_{min}$ is assumed so that the probabilities are identical. The steering angle of each of the vehicle 100 and the object 200 is assumed to be constant until its driver recognizes a danger of collision.

In this embodiment, as the performance limit data, only the maximum turning performance of each of the vehicle 100 and the object 200 is used without using the maximum speed rate thereof so that the most recent detected speed is assumed to be continued after the detection.

The current speed of the vehicle 100 is detected by the vehicle speed sensor 8, and the turning radius of the vehicle 100 is detected by the steering sensor 9 thereof.

Figure 2:
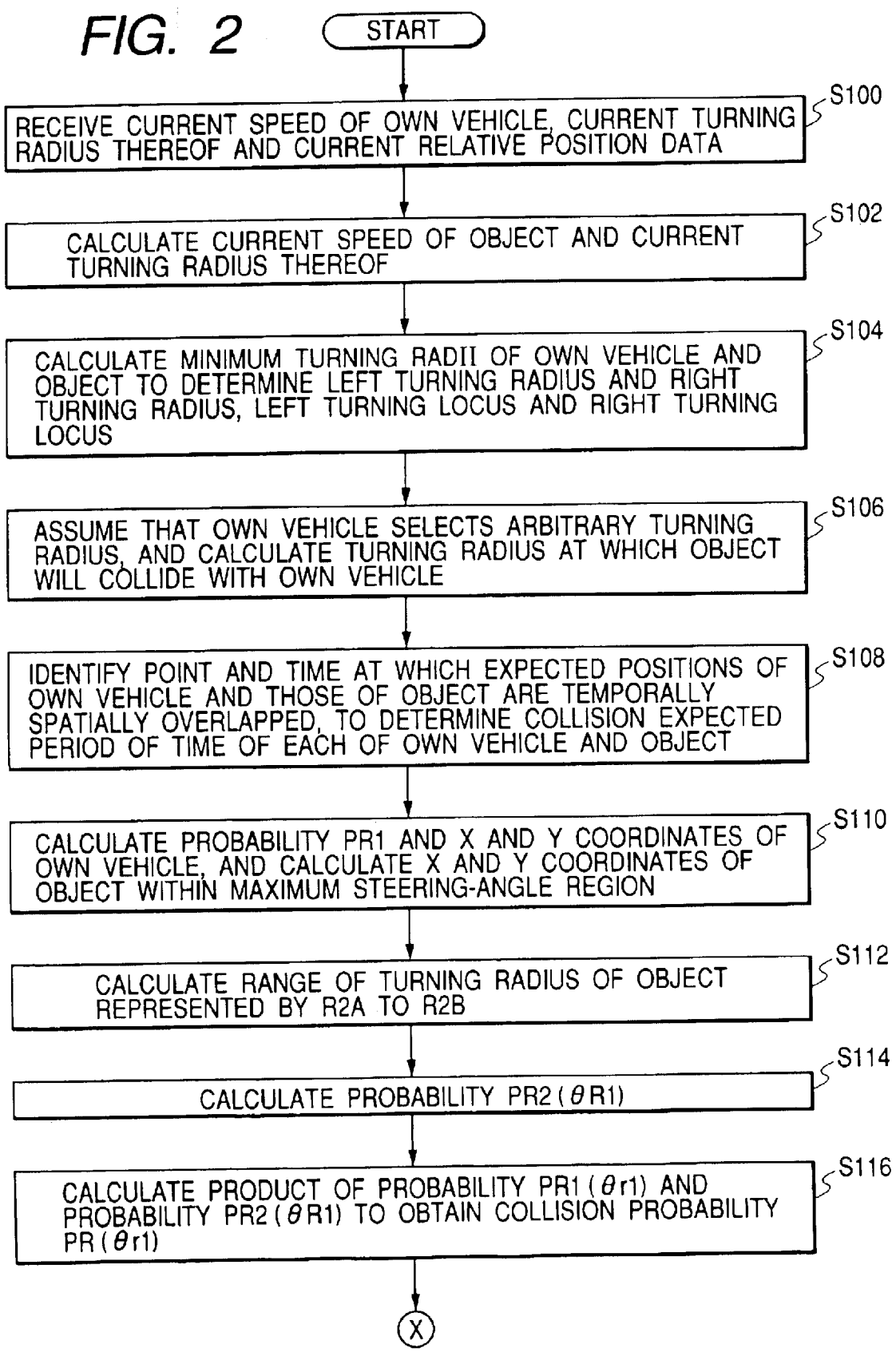
FIG. 2 is a flow chart showing processes performed by a microcomputer shown in FIG. 1 according to the embodiment of the invention.
Figure 3:
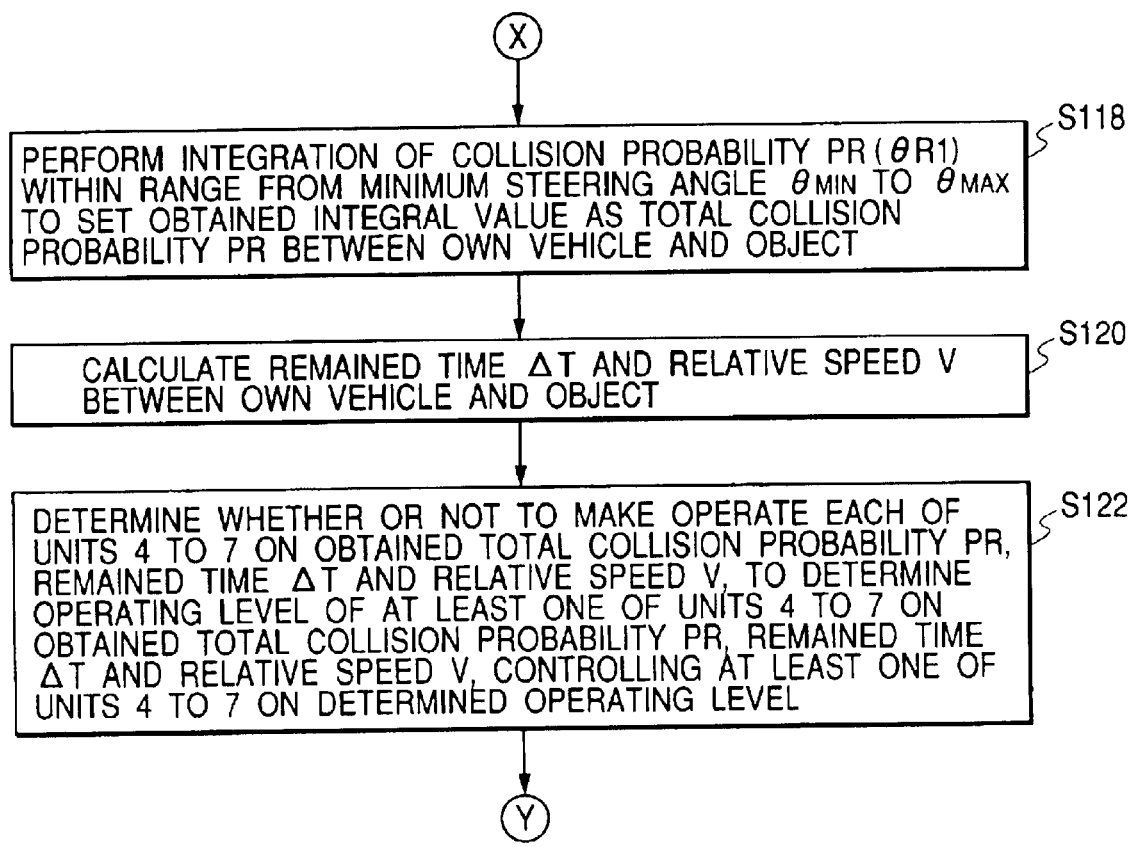
FIG. 3 is a flow chart showing processes performed by a microcomputer shown in FIG. 1 according to the embodiment of the invention.

In step S100 in FIG. 2, the microcomputer 3 regularly receives the current speed of the vehicle 100 from the vehicle speed sensor 8 and the DSP 2, and receives the current turning radius thereof from the steering sensor 9 and the DSP 2. Furthermore, in step S100, the microcomputer 100 regularly receives the current relative position data of the object 200 including the current relative distance L and the current relative angle θ thereof from the DSP 2.

Figure 4:
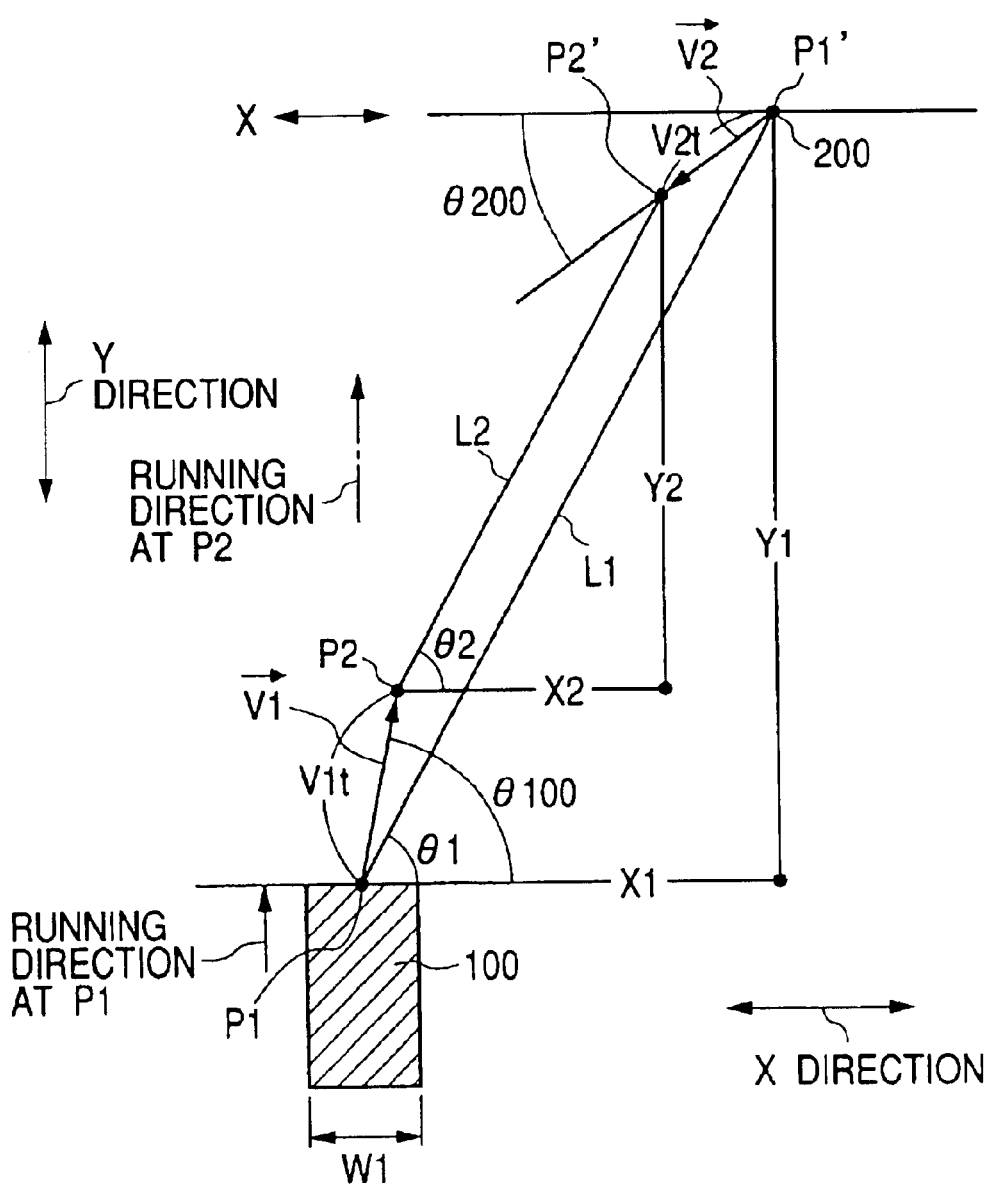
FIG. 4 is an analysis view for obtaining a speed and a turning angle of an object according to the embodiment of the invention.

Next, in step S102, the microcomputer 3 calculates the current speed of the object 200 and the current turning radius thereof according to the received data including the current speed and current turning radius of the vehicle 100 and the current relative position data of the object 200 including the current relative distance L and the current relative angle θ in accordance with a relationship shown in FIG. 4.

In FIG. 4, a reference character P1 represents a previous position of the vehicle 100, a reference character P2 represents a current position of the vehicle 100, a reference character P1' represents a previous position of the object 200 and a reference character P2' represents a current position of the object 200. In addition, in FIG. 4, a reference character $\overline{V1}$ represents a speed vector of the vehicle 100, a reference character $\overline{V2}$ represents a speed vector of the object 200, a reference character L1 represents a previous value of the relative distance L and a reference character θ1 represents a previous value of the relative angle θ of the object 200 with respect to the horizontal direction (X direction) orthogonal to the running direction (Y direction) of the vehicle 100 at the previous position P1.

Moreover, in FIG. 4, a reference character L2 represents a current value of the relative distance L and a reference character θ2 represents a current value of the relative angle θ of the object 200 with respect to the X direction. In particular, a reference character V1 corresponding to the speed vector $\overline{V1}$ of the vehicle 100 represents an average value of the detected speeds by the speed sensor 8 during an elapsed time t from a previous sampling point of sampling each of the previous values L1 and θ1 to a current sampling point of sampling each of the current values L2 and θ2, wherein the V1 is also referred to as "own speed". In FIG. 4, a reference character θ100 represents an angle of the vehicle 100 during the elapsed time t from the previous sampling point to the current sampling point. The angle θ100 of the vehicle 100 can be calculated in accordance with the steering angles outputted from the steering angle sensor 9 during the elapsed time t.

In this embodiment, the runnable two dimensional region is defined so that the running direction of the vehicle 100 at the previous position P1 is supposed to the Y direction and the direction orthogonal to the running direction thereof at the previous position P1 is supposed to the X direction. The current value θ2 of the relative angle θ represents an angle obtained by converting the current relative angle θ detected by the radar sensor 1 and determined on the basis of the direction orthogonal to the running direction of the vehicle 100 at the current position P2 into an angle with respect to the X direction orthogonal to the running direction of the vehicle 100 at the previous position P1 according to the angle θ100 of the vehicle 100.

That is, in step S102, the microcomputer 3, on the basis of the detected values of L1, θ1, L2, θ2, V1, θ100 and t, calculates a running distance V2t of the object 200 and a running angle θ200 of the object 200 during the elapsed time t in accordance with the relationship shown in FIG. 4, and furthermore, divides the running distance V2t by the elapsed time t to calculate the speed V2 of the object 200. These calculations allow the speed V2 and the running angle θ200 of the object 200 during the elapsed time t from the previous sampling point to the current sampling point to be determined. The microcomputer 3 determines these speed V2 and the running angle θ200 as a speed and a running angle of the object 200 at a middle point of the previous position P1' and the current position P2' of the object 200.

Next, in step S104, the microcomputer 3 calculates the minimum turning radius $R_{min}$ of the vehicle 100 due to the maximum horizontal gravity $G_{xmax}$ in accordance with the speed V1 of the vehicle 100 in accordance with the equation (1), and also calculates the minimum turning radius $R_{min}$ of the object 200 due to the maximum horizontal gravity $G_{xmax}$ in accordance with the calculated speed V2 of the object 200 in accordance with the equation (1). Furthermore, in step S104, the microcomputer 3 determines, on the basis of the calculated the minimum turning radius $R_{min}$ of the object 200, a left running locus f2L of the object 200 determined by a left turning radius r2L thereof when its driver sets the left side maximum steering angle within the maximum steering-range to maximally turn the object 200 toward the left side thereof, and a right running locus f2R determined by a right turning radius r2R of the object 200 when its driver sets the right side maximum steering angle within the maximum steering-range to maximally turn the object 200 toward the right side thereof.

Similarly, in step S104, the microcomputer 3 determines, on the basis of the minimum turning radius $R_{min}$ of the vehicle 100, a left running locus f1L determined by a left turning radius r1L of the vehicle 100 when its driver sets the left side maximum steering angle within the maximum steering-range to maximally turn the vehicle 100 toward the left side thereof, and a right running locus f1R determined by a right turning radius r1R of the vehicle 100 when its driver sets the right side maximum steering angle within the maximum steering-range to maximally turn the own vehicle 100 toward the right side thereof.

Figure 5:
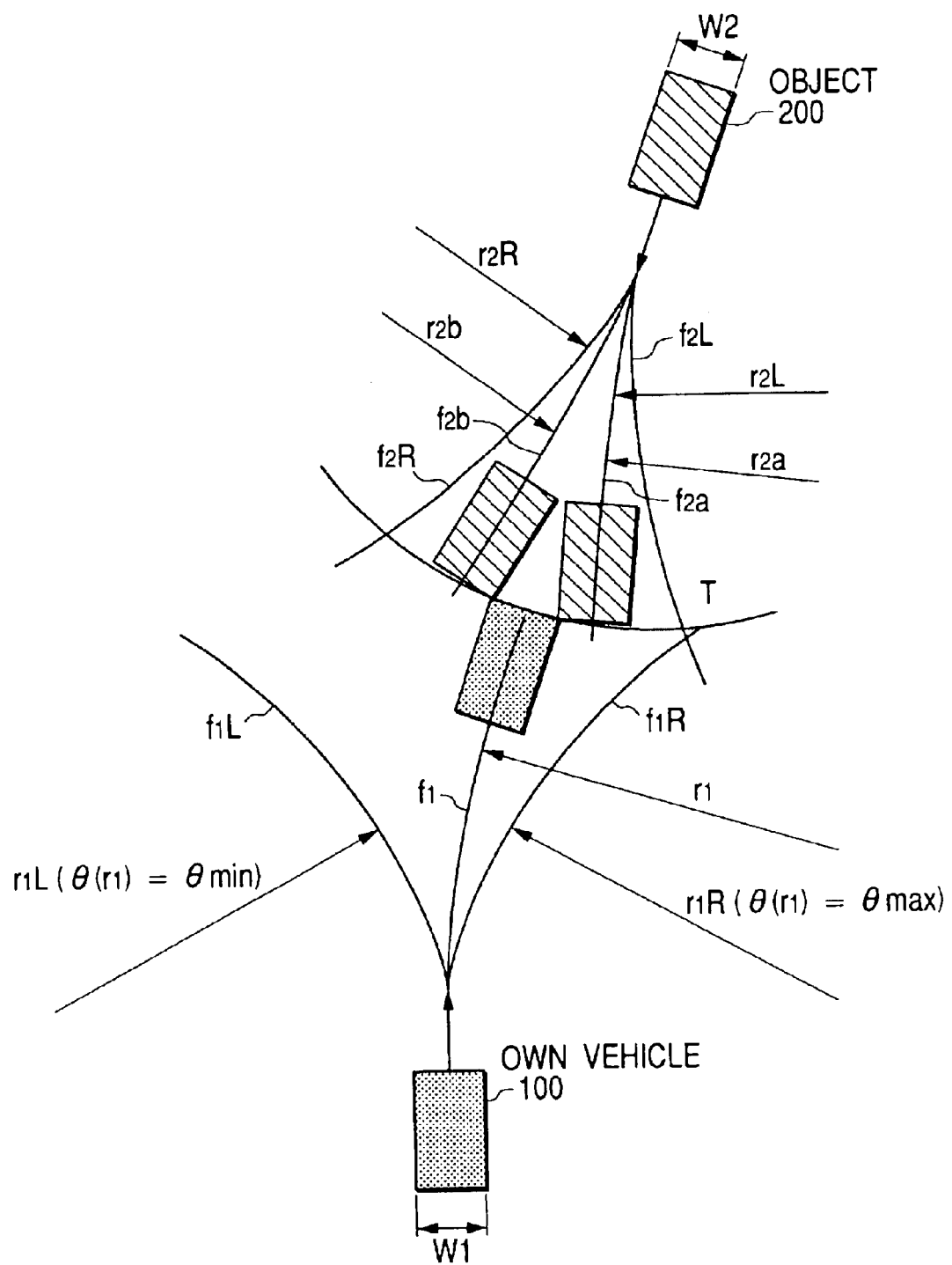
FIG. 5 is a view showing a runnable two dimensional region of vehicle and the object, and running loci thereof on the runnable two dimensional region according to the embodiment of the invention.

The running loci f2L and f2R (turning radii r2L and r2R) mean the limit lines of the runnable two dimensional region on which the object 200 is runnable, and the running loci f1L and f1R (turning radii r1L and r1R) mean the limit lines of the runnable two dimensional region on which the vehicle 100 is runnable so that the running loci f2L and f2R (turning radii r2L and r2R) of the object 200 and the running loci f1L and f1R (turning radii r1L and r1R) of the vehicle 100 are drawn on the runnable two dimensional region (X-Y plane) to be shown in FIG. 5.

That is, in step S104, the microcomputer 3 can expect a running locus of the vehicle 100 as a range between the running locus f1L and the running locus f1R, and also expect a running locus of the object 200 as a range between the running locus f2L and the running locus f2R.

The microcomputer 3, in step S106, assumes that the vehicle 100 selects an arbitrary turning radius r1 corresponding to a steering angle θ(r1) within the range from the turning radius r1L corresponding to a steering angle which is the minimum steering angle θmin to the turning radius r1R corresponding to a steering angle which is the maximum steering angle θmax at this time.

The microcomputer 3, in step S106, calculates a turning radius r2 at which the object 200 will collide with the vehicle 100, turning radius r2 which is within the range from the turning radius r2L to the turning radius r2R. Incidentally, in cases where the vehicle 100 runs straight on the runnable two-dimensional region, the own vehicle 100 selects an infinite turning radius.

After the assuming and calculating processes in step S106, the microcomputer 3, in step S108, calculates the running distances of the vehicle 100 in the range between the running locus f1L and the running locus f1R to divide the calculated running distances of the vehicle 100 by the speed V1, thereby expecting positions of the vehicle 100 in the range between the running loci f1L and f1R. Similarly, in step S108, the microcomputer 3 calculates the running distances of the object 200 in the range between the running locus f2L and the running locus f2R to divide the calculated running distances of the object 200 by the speed V2, thereby expecting positions of the object 200 in the range between the running loci f2L and f2R.

In step S108, the microcomputer 3 identifies a point and a time at which the expected positions of the vehicle 100 and those of the object 200 are temporally spatially overlapped, expecting the overlapped point and time as a collision point and a collision time at which the vehicle 100 and the object 200 will collide with each other.

In step S108, the microcomputer 3 determines a collision expected period of time T of the vehicle 100 including the collision time and predetermined short time periods thereof before and after the collision time when the turning radius r1 is selected within the range from the turning radius r1L to the turning radius r1R. That is, assuming of the turning radius r1 of the vehicle 100, the collision time between the own vehicle 100 and the object 200 is not largely changed even though its driver suddenly steers its handle just before the vehicle 100 and the object 200 are expected to collide with each other.

Similarly, in step S108, the microcomputer 3 determines a collision expected period of time T of the object 200 including the collision time and predetermined short time periods thereof before and after the collision time.

The microcomputer 3 determines each collision expected period of time T of each of the vehicle and the object corresponding to each steering angle θ(r1) within the range from the minimum steering angle θmin to the maximum steering angle θmax.

Next, in step S110, because the probability distribution including the probabilities representing which steering angles of the vehicle 100 are set by its driver within the maximum steering-angle range in its right-left direction, which is as the maximum turning performance of the vehicle 100, is assumed so that the probabilities are the same with each other, the microcomputer 3 calculates a probability Pr1 (θr1) representing a probability that the own vehicle 100 will set the steering angle θ(r1) corresponding to the turning radius r1, and, because the collision expected period of time T is already calculated, the microcomputer 3 calculates the x and y coordinates of the vehicle 100 on the runnable two dimensional region in the collision expected period of time T of the vehicle 100.

Next, in step S112, the microcomputer 3 calculates the x and y coordinates of the object 200 within the maximum steering-angle range in its right-left direction, which is as the maximum turning performance of the object 200 in the collision expected period of time T thereof.

Next, in step S112, the microcomputer 3 calculates, in accordance with the width W1 of the vehicle 100 and the width W2 of the object 200, a range of the turning radius of the object 200, that is represented as r2a to r2b, in which, when the vehicle 100 will set the turning radius r1, the own vehicle 100 and the object 200 will collide with each other, on the basis of the x and y coordinates of the own vehicle 100 and those of the object 200.

Because the probability distribution including the probabilities representing which steering angles of the object 200 are set by its driver within the maximum steering-angle range in its right-left direction, which is as the maximum turning performance of the object 200, is assumed so that the probabilities are the same with each other, the microcomputer 3, in step S114, calculates a probability Pr2 (θr1) representing a probability that the object 200 will set a steering angle within a range from a first steering angle corresponding to the turning radius r2a (running locus f2a) to a second steering angle corresponding to the turning radius r2b (running locus f2b).

Next, in step S116, the microcomputer 3 calculates the product of the probability Pr1(θr1) and the probability Pr2(θr1) so as to set the product as a collision probability Pr(θr1) representing a probability, when the vehicle 100 will set the steering angle θ(r1) corresponding to the turning radius r1, that the vehicle 100 and the object 200 will collide with each other.

Next, in step S118, the microcomputer 3 performs integration of the collision probability Pr(θr1) within the range from the minimum steering angle θmin corresponding to the turning radius r1L of the vehicle 100 to the maximum steering angle θmax corresponding to the turning radius r1R thereof, integration which is shown as the following equation (2):

$$Pr1 = \int_{\theta(r1)=\theta min}^{\theta(r1)=\theta max} Pr1(\theta r1) \times Pr2(\theta r1) d\theta(r1) \qquad (2)$$

The microcomputer 3, in step S118, sets the obtained integral value by the integration in accordance with the equation (2) as a total collision probability Pr which shows a collision probability between the vehicle 100 and the object 200.

(Calculation of Remaining Time)

Next, in step S120, the microcomputer 3 calculates, when the vehicle 100 selects a running locus (a turning radius) and the object 200 selects a running locus (a turning radius) so that the vehicle 100 will collide earliest with the object, a remaining time ΔT until the vehicle 100 will collide earliest with the object 200. This calculation can be performed by calculating each time until the vehicle 100 will collide with the object 200 for each running locus (each turning radius) of each of the vehicle 100 and the object 200 so as to select, as the remaining time ΔT, the minimum time in the calculated times. Usually, because the running locus of the vehicle 100 corresponding to the remaining time ΔT is a first running locus which is the closest to the object 200 in the X direction and that of the object 200 corresponding to the remaining time ΔT is a second running locus which is the closest to the vehicle 100 in the X direction, the remaining time ΔT can be set to the time until when the vehicle 100 will collide with the object 200 when the vehicle 100 takes the first running locus and the object 200 takes the second running locus.

(Calculation of Relative Speed)

The microcomputer 3, in step S120, calculates a relative speed V between the vehicle 100 and the object 200 at this time. The relative speed V can be calculated as the absolute value of the synthesis speed vector synthesized by the speed vector $\overline{V1}$ of the vehicle 100 composed of the speed V1 and the direction of θ100 and the speed vector $\overline{V2}$ of the object 200 composed of the speed V2 and the direction of θ200.

(Control of Avoiding a Collision and Reducing Damage in a Collision)

Next, the microcomputer 3, in step S122, determines, on the basis of the obtained total collision probability Pr, the remaining time ΔT and the relative speed V, whether or not to operate each of the collision avoidance units including the annunciation unit 7 and the collision damage reduction units including the airbag unit 4, the seat belt roll-up device 5 and the braking power increasing unit 6. In addition, the microcomputer 3, in step S122, when determining to operate at least one of the airbag unit 4, the seat belt roll-up device 5, the braking power increasing unit 6 and the annunciation unit 7, determines, on the basis of the total collision probability Pr, the remaining time ΔT and the relative speed V, the operating range (operating level) of the at least one of the airbag unit 4, the seat belt roll-up device 5, the braking power increasing unit 6 and the annunciation unit 7 so as to control the at least one of the airbag unit 4, the seat belt roll-up device 5, the braking power increasing unit 6 and the annunciation unit 7 on the basis of the determined operating range.

In particular, in this embodiment, the microcomputer 3 previously stores on its memory unit MU the map 3B representing a relationship between operation determining parameters including the total collision probability Pr, the remaining time ΔT and the relative speed V and controlling parameters including the propriety of operating each of the airbag unit 4, the seat belt roll-up device 5, the braking power increasing unit 6 and the annunciation unit 7, and each of the operating levels of each of the airbag unit 4, the seat belt roll-up device 5, the braking power increasing unit 6 and the annunciation unit 7.

That is, in step S122, the microcomputer 3 substitutes the obtained operation determining parameters of the total collision probability Pr, the remaining time ΔT and the relative speed V into the map 3B to obtain a combination of the control parameters including at least one of the operating levels of at least one of the airbag unit 4, the seat belt roll-up device 5, the braking power increasing unit 6 and the annunciation unit 7. Next, in step S122, the microcomputer 3 controls the at least one of the airbag unit 4, the seat belt roll-up device 5, the braking power increasing unit 6 and the annunciation unit 7 on the basis of the obtained control parameters.

For example, according to the map 3B in this embodiment, the microcomputer 3, when the total collision probability Pr exceeds a predetermined threshold value Pth1, controls to instruct the airbag unit 4 to deploy each airbag, to instruct the braking power increasing unit 6 to increase the braking power of the braking unit so as to maximize the effectiveness of the braking of the braking unit and to operate the annunciation unit 7.

According to the map 3B, when the total collision probability Pr is within a range from a predetermined threshold value Prth2 to the threshold value Prth1, the microcomputer 3 instructs the seat belt roll-up device 5 to roll-up each seat belt so as to increase the tension of each seat belt and the braking power increasing unit 6 to increase the braking power of the braking unit so as to maximize the effectiveness of the braking of the braking unit, without instructing the airbag unit 4 and the annunciation unit 7.

According to the map 3B, when the total collision probability Pr is less than the threshold value Prth2, the microcomputer 3 does not operate to control all of the airbag unit 4, the seat belt roll-up device 5, the braking power increasing unit 6 and the annunciation unit 7.

Even if the control parameters are determined according to the total collision probability Pr, when the remaining time ΔT is not less than predetermined value, the microcomputer 3 delays the operation of at least one of the airbag unit 4, the seat belt roll-up device 5, the braking power increasing unit 6 and the annunciation unit 7 corresponding to the control parameters. When the remaining time ΔT is less than the predetermined value, the microcomputer 3 immediately causes operation of at least one of the airbag unit 4, the seat belt roll-up device 5, the braking power increasing unit 6 and the annunciation unit 7 corresponding to the control parameters.

Furthermore, when the relative speed V is increased, damage in a collision is expected to be serious, and when the relative speed V is low, damage in a collision is expected to be insignificant. Therefore, the microcomputer 3 can change the threshold values of Prth2 and Prth1 according to the relative speed V. That is, for example, the microcomputer 3 controls the threshold values of Prth2 and Prth1 to be decreased when the relative speed V is increased.

The microcomputer 3 repeatedly performs the processes of step S100 to step S122 each time the current speed and the current turning radius of the vehicle 100, and the current relative position data of the object 200 are received by the microcomputer 3.

(First Modification)

In this embodiment, no control of the steering angle of the vehicle 100 is performed. However, in the first modification, control of the steering angle of the own vehicle may be performed. More specifically, the microcomputer 3 may force, on the basis of a probability distribution including each collision probability Pr1 (θr1) of each steering angle θ(r1), the vehicle 100 to be guided (steered) in a direction to which the value of the collision probability Pr1 (θr1) is decreased, or may brake the vehicle 100.

(Second Modification)

In this embodiment, using the total collision probability Pr based on each of the performance limit data of each of the vehicle and the object allows the operation of at least one of the collision avoidance units and the collision damage reduction units to be controlled. However, in the second modification, it may be possible to control at least one of the collision avoidance units and the collision damage reduction units according to a distribution of the collision probabilities (local collision probabilities) in the X direction based on the each of the performance limit data of each of the vehicle and the object. For example, it may be possible to force the vehicle to be guided (steered) in a direction to which the value of the collision probability in the X direction is decreased, or a direction to which the absolute value of the relative speed is decreased.

(Third Modification)

In this embodiment, the speed of each of the vehicle and the object is assumed to be kept at each of the current speeds of each of the vehicle and the object after each of the current speeds are detected. However, the current speed rate may be kept. Moreover, in the vehicle, any speed may be set within the range of the maximum decelerating rate determined by the performance limit data of the vehicle, and similarly, in the object, any speed may be set within the range of the maximum decelerating rate determined by the performance limit data of the object.

In addition, the current speed rate may be assumed to be kept until the speed of the vehicle suddenly changes. After the suddenly change of the speed, the current speed of the vehicle may be assumed to be decelerated at the maximum decelerating rate of the vehicle as determined by the performance limit data thereof. Similarly, the current speed rate may be assumed to be kept until the speed of the object suddenly changes, and after the sudden change of the speed, the current speed of the object may be assumed to be decelerated at the maximum decelerating rate of the object which is determined by the performance limit data thereof. In addition, when calculating each of the maximum decelerating rate of each of the vehicle and the object, it may be possible to change each of the maximum decelerating rate of each of the vehicle and the object on the basis of the degree of wear of the brakes or the wheels of each of the own vehicle and the object and/or conditions of load related to climate conditions.

(Fourth Modification)

In this embodiment, the probabilities representing which steering angles of the vehicle or the object are set by its driver within the maximum steering-angle range in its right-left direction are assumed to be the same. However, in a fourth modification, the steering angles set by each driver may be researched so that the probabilities representing which steering angles of the vehicle or the object are set by its driver within the maximum steering-angle range in its right-left direction may be different according to the researched result, making it possible to calculate the collision probabilities of the vehicle of the object on the basis of the different probabilities thereof.

Incidentally, the microcomputer 3 may perform the processes of the DSP 2. The microcomputer 3 may comprises a plurality of computer units which may perform the processes shown in FIGS. 2 and 3 in a distributed manner.

While the above description is what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A collision damage reduction system installed on a vehicle and having an operation unit capable of performing at least one of a first operation of avoiding a collision of the vehicle with an object and a second operation of reducing damage in the collision, said system comprising:

a first detecting unit configured to regularly detect a relative position data corresponding to a relative position between the vehicle and the object;

a second detecting unit configured to regularly detect a speed of the vehicle;

means for determining a probability of operation that a driver of the vehicle will carry out an operation for avoiding the collision of the vehicle with the object;

means for obtaining a first performance limit data of the vehicle according to the detected speed thereof and the determined operation probability, and a second performance limit data of the object according to the relative position data and the detected speed of the vehicle;

means for calculating a total collision probability representing a probability that the vehicle and the object will collide with each other on a runnable space according to the first performance limit data, the second performance limit data, the detected speed of the vehicle and the relative position data, said vehicle and object being runnable on the runnable space; and means for instructing the operation unit to operate at least one of the first operation and the second operation according to the total collision probability.

2. A collision damage reduction system according to claim 1, wherein said calculating means comprises:

means for expecting a first running locus of the vehicle on the runnable space according to the first performance limit data;

means for expecting a second running locus of the object on the runnable space according to the second performance limit data;

means for obtaining a region on which the first running locus of the vehicle and the second running locus of the object are temporally spatially overlapped so as to expect the overlapped region as a collision region on which the vehicle and the object will collide with each other;

means for obtaining a first probability distribution including probabilities that the vehicle will exist on the collision region according to the first performance limit data and a second probability distribution including probabilities that the object will exist on the collision region according to the second performance limit data; and means for calculating the total collision probability according to the obtained first and second probability distributions.

3. A collision damage reduction system according to claim 1, wherein said first performance limit data includes at least one of a maximum speed rate of the vehicle in its running direction at a current time, and a maximum displaceable amount of the vehicle in a direction orthogonal to its running direction at a current time during a movement of the vehicle by unit distance in its running direction or after a predetermined unit time being passed, and wherein said second performance limit data includes at least one of a maximum speed rate of the object in its running direction at a current time and a maximum displaceable amount of the object in a direction orthogonal to its running direction at a current time during a movement of the object by unit distance in its running direction or after a predetermined unit time has passed.

4. A collision damage reduction system according to claim 3, wherein said maximum displaceable amount of the vehicle represents a maximum turning performance of the vehicle related to a maximum steering-range thereof, and said maximum displaceable amount of the object represents a maximum turning performance of the object related to a maximum steering-range thereof.

5. A collision damage reduction system according to claim 2, further comprising means for calculating remaining time until which the vehicle and the object will collide with each other according to the collision region, and wherein said instructing means instructs the operation unit to operate at least one of the first operation and the second operation according to the total collision probability and the remaining time.

6. A collision damage reduction system according to claim 5, further comprising means for calculating a relative speed between the own vehicle and the object according to the relative position data and the detected speed of the own vehicle, and wherein said instructing means instructs the operation unit to operate at least one of the first operation and the second operation according to the total collision probability, the remaining time and the relative speed.

7. A collision damage reduction system according to claim 6, further comprising a map data representing a relationship between a parameter data and an operating level of the operation unit, said parameter data including each of the total collision probability, the remaining time and the relative speed, and wherein said instructing means instructs the operation unit to operate at least one of the first operation and the second operation according to the map data.

8. A computer-readable program product used for a collision damage reduction system, in which said collision reduction system is installed on an vehicle and has an operation unit capable of performing at least one of a first operation of avoiding a collision of the vehicle with an object and a second operation of reducing damage in the collision, a first detecting unit configured to regularly detect relative position data corresponding to a relative position between the vehicle and the object and a second detecting unit configured to regularly detect a speed of the vehicle, said program product comprising:

means for causing a computer to determine a probability of operation that a driver of the vehicle will carry out an operation for avoiding the collision of the vehicle with the object;

means for causing a computer to obtain a first performance limit data of the vehicle according to the detected speed thereof and the determined operation probability, and a second performance limit data of the object according to the relative position data and the detected speed of the vehicle;

means for causing a computer to calculate a total collision probability representing a probability that the vehicle and the object will collide with each other on a runnable space according to the first performance limit data, the second performance limit data, the detected speed of the vehicle and the relative position data, said vehicle and object being runnable on the runnable space; and means for causing a computer to instruct the operation unit to operate at least one of the first operation and the second operation according to the total collision probability.

9. A computer-readable program product according to claim 8, wherein said calculating means comprises:

means for expecting a first running locus of the vehicle on the runnable space according to the first performance limit data;

means for expecting a second running locus of the object on the runnable space according to the second performance limit data;

means for obtaining a region on which the first running locus of the vehicle and the second running locus of the object are temporally spatially overlapped so as to expect the overlapped region as a collision region on which the vehicle and the object will collide with each other;

means for obtaining a first probability distribution including probabilities that the vehicle will exist on the collision region according to the first performance limit data and a second probability distribution including probabilities that the object will exist on the collision region according to the second performance limit data; and means for calculating the total collision probability according to the obtained first and second probability distributions.

10. A computer-readable program product according to claim 8, wherein said first performance limit data includes at least one of a maximum speed rate of the vehicle in its running direction at a current time, and a maximum displaceable amount of the vehicle in a direction orthogonal to its running direction at a current time during a movement of the vehicle by unit distance in its running direction or after a predetermined unit time being passed, and wherein said second performance limit data includes at least one of a maximum speed rate of the object in its running direction at a current time and a maximum displaceable amount of the object in a direction orthogonal to its running direction at a current time during a movement of the object by unit distance in its running direction or after a predetermined amount of time has passed.

11. A computer-readable program product according to claim 10, wherein said maximum displaceable amount of the vehicle represents a maximum turning performance of the vehicle related to a maximum steering-range thereof, and said maximum displaceable amount of the object represents a maximum turning performance of the object related to a maximum steering-range thereof.

12. A computer-readable program product according to claim 9, further comprising means for causing a computer to calculate remaining time until which the vehicle and the object will collide with each other according to the collision region, and wherein said instructing means instructs the operation unit to operate at least one of the first operation and the second operation according to the total collision probability and the remaining time.

13. A computer-readable program product according to claim 12, further comprising means for causing a computer to calculate a relative speed between the vehicle and the object according to the relative position data and the detected speed of the vehicle, and wherein said instructing means instructs the operation unit to operate at least one of the first operation and the second operation according to the total collision probability, the remaining time and the relative speed.

14. A computer-readable program product according to claim 13, wherein said collision damage reduction system includes a map data representing a relationship between a parameter data and an operating level of the operation unit, said parameter data including each of the total collision probability, the remaining time and the relative speed, and wherein said instructing means instructs the operation unit to operate at least one of the first operation and the second operation according to the map data.

15. A collision damage reduction system according to claim 1, wherein said operation probability includes a probability that the driver of the vehicle will handle a brake of the vehicle.

16. A collision damage reduction system according to claim 1, wherein said operation probability includes a probability that the driver of the vehicle will turn a steering wheel of the vehicle to steer the vehicle.

17. A computer-readable program product according to claim 8, wherein said operation probability includes a probability that the driver of the vehicle will handle a brake of the vehicle.

18. A computer-readable program product according to claim 8, wherein said operation probability includes a probability that the driver of the vehicle will turn a steering wheel of the vehicle to steer the vehicle.

* * * * *